Inventor
MITCHELL CARTER

Patented Jan. 23, 1945

2,367,819

UNITED STATES PATENT OFFICE 2,367,819

ARTICLE FORMING METHOD

Mitchell Carter, Trenton, N. J., assignor to The Firestone Tire & Rubber Company, Akron, Ohio, a corporation of Ohio Application December 28, 1940, Serial No. 372,039

1 Claim. (Cl. 18—58)

This invention relates to the formation of articles generally, and especially has reference to forming rubber articles directly from latex.

Heretofore, it has been impossible to deposit a continuous, solid film of rubber on a porous form by dipping same into latex, because air bubbles or holes would be formed in the rubber as it was deposited on the form. These bubbles or holes are produced by air originally present in the voids or cells of the porous form, which air is compressed when the water from the latex is drawn into the molds and the compressed air breaks through or is embedded in the film of rubber on the form so as to leave holes or bubbles therein. This understanding of such action is substantiated by the fact that a piece of plaster of Paris or other porous material, when immersed in water or latex, will have air bubbles form thereon, which bubbles finally break away from the plaster of Paris and escape from the liquid as long as there is any air remaining in the plaster of Paris and water is being absorbed thereby. Air bubbles present in the latex add to the difficulty of forming an unbroken rubber surface from latex even when non-porous forms are used.

The above problem also arises when water or latex is poured into a substantially dry plaster vessel or mold, because the cells in the plaster are so minute that friction prevents even a minor portion of the air entrapped in the mold from escaping from the mold through its outer surface, even in a thin walled mold. In all events, not enough air escapes from the outer surface to prevent bubbles from forming on the inner surface of the mold.

The above-noted difficulty existing in casting latex in porous forms has been partially overcome by the latex casting method shown in applicant's U. S. Patent No. 2,161,281, by partially saturating the mold with water and placing same in a dehydrating chamber to evaporate the moisture drawn into the mold from the latex from the outer mold surface. Obviously this method cannot be used for making dipped articles.

The general object of the present invention is to overcome the foregoing and other disadvantages in making dipped or cast rubber articles from latex.

Another object of the invention is to provide a novel and improved method by which molded or cast rubber articles having smooth, unbroken, substantially solid surfaces can be rapidly formed from latex.

A further object is to provide a process by which an unbroken, solid rubber film can be deposited from latex containing air bubbles.

Another object of the invention is to provide a satisfactory, easily practiced method for saturating a porous material with a liquid.

The foregoing and other objects will be manifest from the following description of the invention and the accompanying drawings, in which Figure 1 is a diagrammatic elevation of apparatus for performing the fabric impregnating method of the invention;

Similar numerals refer to similar parts throughout the specification.

The present invention will be described with relation to the formation of rubber articles made directly from latex. "Latex" in the specification is used in its broadest sense, including all natural or artificial dispersions of rubber or rubber-like materials.

Figure 3:
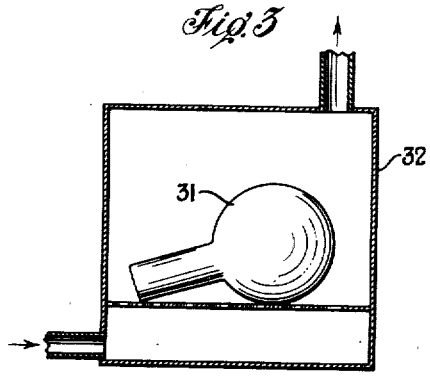
Figure 3 is a sectional view of a steam chamber for treating a porous mold or form according to the invention.
Figure 4:
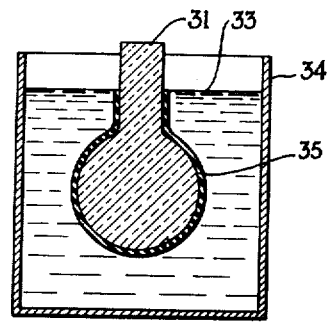
Figure 4 is a sectional view of a treated form immersed in latex.
Figure 5:
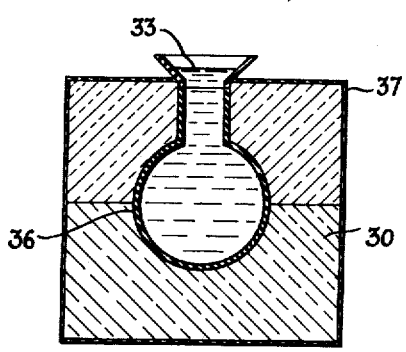
Figure 5 is a sectional view of a mold for casting latex according to the invention.

Figs. 3, 4 and 5 illustrate a method of making a rubber article in accordance with the invention. A porous mold 30 or form 31, which is made from any suitable material such as plaster of Paris, and in which the article is to be made is first placed in a steam chamber 32 and allowed to remain therein until the steam thoroughly impregnates the porous mold and drives the air therefrom, the mold being raised to the steam temperature during this operation. Then, the mold or form is removed from the steam chamber and substantially immediately immersed in latex 33 contained in a tank 34, or latex is poured therein substantially immediately after removing it from the steam chamber. The latex should be about at room temperature and, in all events, is below the temperature of the mold 30 or 31 whereby the relatively cold latex functions to condense the steam contained in the porous mold which, obviously, sets up an appreciable vacuum therein, since a given weight of steam occupies substantially 1700 times the volume of an equal weight of water. The vacuum so generated in the porous mold acts to draw out water from the latex rapidly, whereby the rubber particles contained in the latex are deposited on the surface of the mold. The rubber layer 35 or 36 deposited is free from air bubbles or holes, since there is no air present to form same, as outlined above, but passageways for the water through the carteroids remain in the rubber until the desired deposit of latex rubber is obtained.

The porous mold will continue to withdraw water from the latex and deposit rubber onto the mold as long as any substantial amount of uncondensed steam remains or until the vacuum created by such condensation is satisfied. The deposited rubber does not prevent continuous passage of water. In some instances, several articles with fairly thick walls can be successively made in a mold or form without replacing same in the steam chamber for additional steam impregnation. The porous mold used should have cells small enough to filter the rubber out of the latex and deposit it on the mold while water is being drawn from the latex. Such molds usually contain about 20 to 30% voids and the latex used in dipping and casting methods contains from 35 to 60% water, so that an appreciable film of latex rubber can be deposited on the walls of a mold in one depositing operation.

All operations such as clamping the mold section together, filling and draining the mold, or removing the article produced, may be done at room temperature. No drying or dehydrating chamber for the molds is required since the water absorbed into the porous molds during the article formation period is driven therefrom when the porous molds are again saturated with steam or dried from surface vaporization when the molds are taken from the steam chamber. Hence the molds used may be run continuously through the production cycle.

The drying time of the article produced is quite short, as the film of rubber formed on the mold is sufficiently porous to enable water to pass therethrough into the mold. Thus molds can be turned over appreciably faster than with any previously known latex depositing method. After the rubber article is formed on the mold, the final drying and vulcanization thereof can be effected in any suitable manner.

The invention is especially suited to make dipped goods such as balloons, gloves, etc., from latex, although it also is suited for internally casting latex in porous molds to produce practically all articles capable of being made from latex. The articles made seem to have improved physical characteristics, such as enhanced tear-resistance, due to practically no grain being produced in the rubber formed.

When a thick walled rubber article is to be made by casting latex in a porous mold 30, it is highly desirable to place a removable, impervious covering 37, such as a film of latex, on the outside of the mold, whereby substantially the entire shrinkage vacuum produced in the mold's cells, and its full capillary action, act to draw water from the latex into the mold and deposit rubber on same.

A feature of the invention is that even latex containing air bubbles may be used in practicing the invention. Such bubbles appear to be released from the latex as the water thereof is drawn through any deposited rubber and into the mold. The heat of the mold probably aids in obtaining this action.

Another feature of the invention is that the molds or forms may be handled by hand even immediately after they are withdrawn from the steam treating chamber, since the steam on the outer surface of the porous mold or form evaporates rapidly and cools the mold. However, as stated before, a mold is in proper condition for use in practicing the invention for an appreciable period of time due to the minute cells and complicated arrangement thereof in the interior of the mold preventing rapid flow through the mold and the steam condensation obviously does not take place until the temperature of the steam is reduced sufficiently to produce such action.

The principal of the present invention is applicable to any use wherein a porous material is to be coated with rubber. For example, the invention may be used to impregnate cloth or canvas with oil, latex or the like. Specifically, the invention is adapted to impregnate cords, used in forming tire fabric, with latex, i. e., latex rubber. That is, the cords are passed through a steam chamber and saturated with steam, after which they are immediately immersed in latex at room temperature whereby rubber is drawn into and impregnates the pores of the thread as much as is possible in view of the size of the latex rubber particle in relation to the pore size of the cord. Of course, other volatile liquids than water may be used to impregnate the porous article, mold or the like when moisture is objectionable in the article produced.

Figure 1:
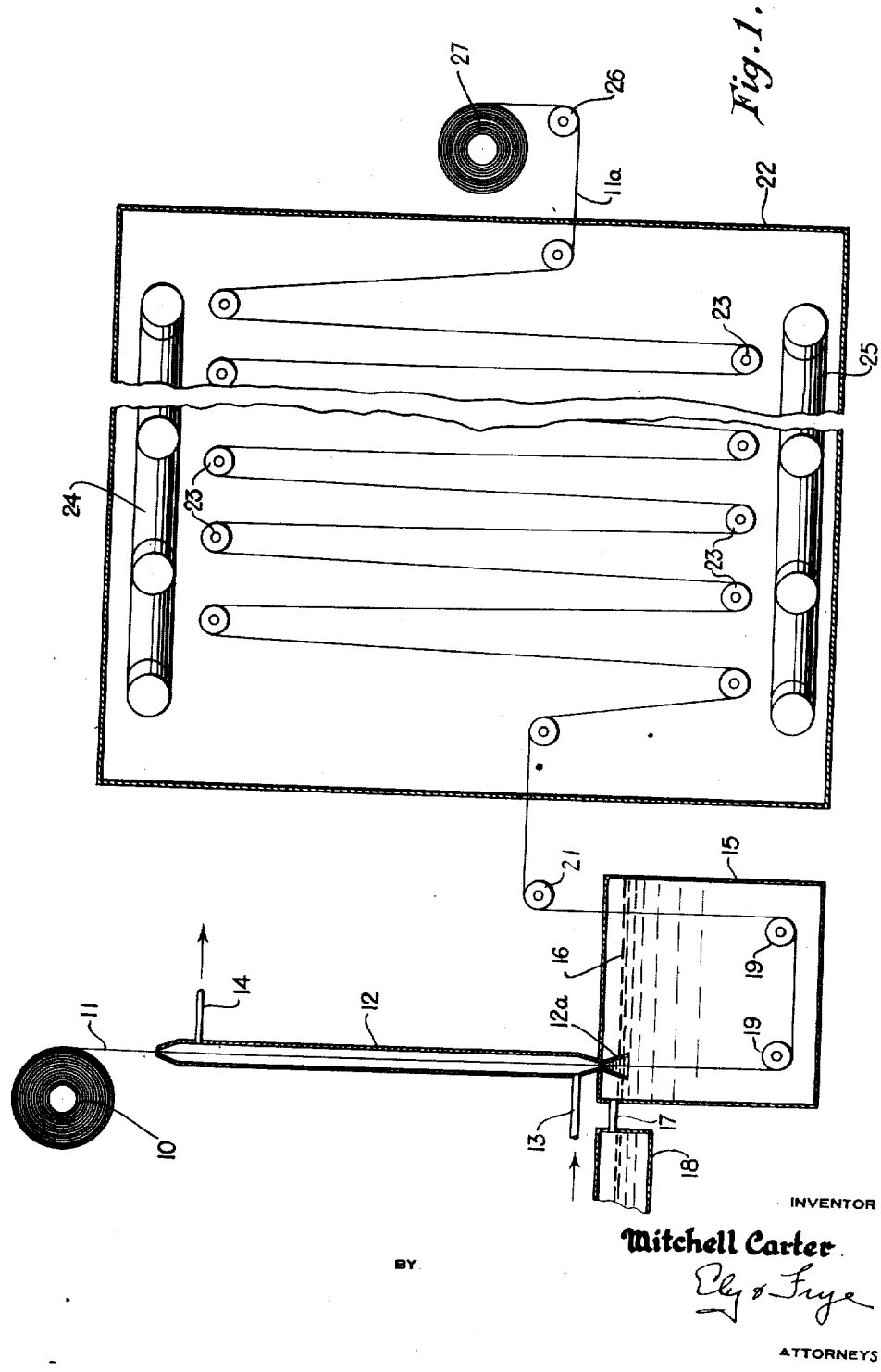

Referring specifically to Figure 1, a roll 10, which has any suitable cord fabric 11 wrapped therearound, is shown. The fabric 11 is led from the roll 10 to a chamber 12 which has steam, or other suitable vapor fed thereto from a source (not shown) of same through an inlet pipe 13 and exhausted therefrom, under slight vacuum, through an exhaust pipe 14. The speed of passage of the fabric 11 through the chamber 12 is so correlated to the length thereof that the fabric is heated thoroughly in the chamber and impregnated with steam while passing therethrough. That is, the air contained in the pores, or voids of the cords forming the fabric 11 is replaced by steam vapor. Preferably, the steam fed to the chamber 12 is dry, or it may even be superheated, whereby the fabric is not wetted appreciably while in the chamber. The steam-impregnated fabric 11 passes out of the chamber 12 through an outwardly flared end portion 12a of the chamber, which end is inserted in a tank 15 containing latex 16. Latex is fed to the tank 15 and maintained at a given level therein by a pipe 17 which connects to a tank 18 having a constant level of latex therein. The slight vacuum set up in the steam chamber 12 allows the latex 16 to rise into the end portion 12a of the chamber, as shown. The latex 16 is usually maintained at room temperature and, in all events, is at a temperature substantially below that of the steam impregnated fabric with suitable insulation being provided between the chamber 12 and the tank for this purpose, if desired. The relatively cool latex condenses the steam carried in the pores of the cords forming the fabric and sets up an appreciable vacuum in the pores of, and around the cords of the fabric, whereby the latex, including the particles of rubber therein, is drawn into the pores of and onto the cords of the fabric.

The fabric will continue to draw latex therein as long as any substantial amount of uncondensed steam remains in or on the fabric, which is immersed in the latex bath a sufficient length of time for all the steam in the fabric to be condensed.

The fabric 11 is drawn around rolls 19, 19, in the latex 16 and it then passes over a roll 21 into a drier 22, of any suitable construction, where the fabric is threaded around a plurality of rolls 23. Steam or hot air is circulated through the drier 22 by introducing the same into the drier through a pipe 24 and exhausting it therefrom by a pipe 25. In all events, the latex contained in the fabric 11 is thoroughly gelled and dried to form a rubber coated fabric 11a as the fabric passes through the drier. The rubber obtained from the latex is free from air bubbles or holes formed by the bursting of air bubbles in the rubber since there is no air present in the fabric to form same.

The rubber coated fabric 11a is led from the drier 22 to a guide roll 26 and then is wound upon a roll 27 to be stored thereon, or, the fabric may be led to any other desired apparatus for processing same.

Figure 2:
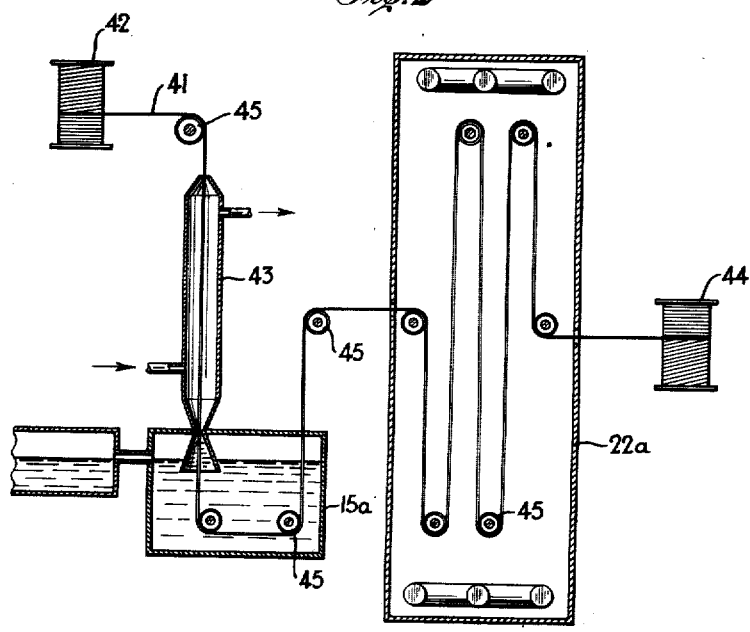
Figure 2 is a similar view of apparatus for impregnating cord or thread.

The apparatus shown in Figure 2 is similar to that shown in Figure 1, but is designed for impregnating a single cord or thread 41. The thread is drawn from a spool 42, through a steaming chamber 43, a latex impregnating tank 15a, a drier 22a, and is then wound upon a spool 44 by suitable means (not shown). The thread is supported and guided through the apparatus by suitable pulleys 45, 46.

It may be that in steam impregnating cord or fabric and immersing same in latex, the latex particles do not actually penetrate into the pores of the cords, but that the water is drawn into such pores and the latex rubber particles are merely deposited on the outer surface of the cord fibers. However, practice of the invention impregnates the pores of the cords as much as is possible in view of the size of the latex rubber particles in relation to the pore size of the cords. The process of the invention serves to drive out the air originally contained in the cord's pores, whereby the formation of air bubbles or holes produced thereby in the rubber coated cord or fabric is avoided. Also, the invention provides a rapid, positive method of depositing rubber upon a cord, thread or fabric by immersing same in latex.

Latex used in the practice of the invention may be compounded in any desired manner and contain any suitable gelling and vulcanizing ingredients.

When a greater vacuum is required in order to give complete impregnation, the steam used for saturation purposes may be superheated at atmospheric pressure, whereby its volume is materially increased, which sets up a greater vacuum when the steam is condensed and which also increases the rate of heat transfer between the steam impregnated article and the latex or other material to be drawn into the steam impregnated article to replace the steam condensed therein. When a viscous substance is to be used in saturating a porous material, such as wood, such substance may be heated to reduce its viscosity to expedite drawing same into the porous material. This heating action is particularly adapted to be used when superheated steam or the like is used to impregnate the porous material initially.

While several embodiments of the invention have been completely illustrated and described herein, it will be appreciated that the scope of the invention includes modifications thereof such as come under the appended claim.

What is claimed is:

That method of forming rubber articles from an aqueous rubber dispersion, said method comprising the steps of impregnating with steam a porous mold having an impervious skin over its outer surface and which is adapted to receive latex therein, associating the impregnated mold with a rubber dispersion, condensing the steam in the pores of the mold to form a vacuum therein, and drawing water from the dispersion into the pores of the mold to deposit rubber onto the mold, whereby substantially the entire shrinkage vacuum produced acts upon the inner surface of the mold.

MITCHELL CARTER.

---

CERTIFICATE OF CORRECTION.

Patent No. 2,367,819. January 23, 1945.

MITCHELL CARTER.

It is hereby certified that error appears in the printed specification of the above numbered patent requiring correction as follows: Page 2, second column, line 14, strike out the word and comma "oil,"; and that the said Letters Patent should be read with this correction therein that the same may conform to the record of the case in the Patent Office.

Signed and sealed this 15th day of May, A. D. 1945.

Leslie Frazer (Seal) Acting Commissioner of Patents.

fabric is threaded around a plurality of rolls 23. Steam or hot air is circulated through the drier 22 by introducing the same into the drier through a pipe 24 and exhausting it therefrom by a pipe 25. In all events, the latex contained in the fabric 11 is thoroughly gelled and dried to form a rubber coated fabric 11a as the fabric passes through the drier. The rubber obtained from the latex is free from air bubbles or holes formed by the bursting of air bubbles in the rubber since there is no air present in the fabric to form same.

The rubber coated fabric 11a is led from the drier 22 to a guide roll 26 and then is wound upon a roll 27 to be stored thereon, or, the fabric may be led to any other desired apparatus for processing same.

The apparatus shown in Figure 2 is similar to that shown in Figure 1, but is designed for impregnating a single cord or thread 41. The thread is drawn from a spool 42, through a steaming chamber 43, a latex impregnating tank 15a, a drier 22a, and is then wound upon a spool 44 by suitable means (not shown). The thread is supported and guided through the apparatus by suitable pulleys 45, 45.

It may be that in steam impregnating cord or fabric and immersing same in latex, the latex particles do not actually penetrate into the pores of the cords, but that the water is drawn into such pores and the latex rubber particles are merely deposited on the outer surface of the cord fibers. However, practice of the invention impregnates the pores of the cords as much as is possible in view of the size of the latex rubber particles in relation to the pore size of the cords. The process of the invention serves to drive out the air originally contained in the cord's pores, whereby the formation of air bubbles or holes produced thereby in the rubber coated cord or fabric is avoided. Also, the invention provides a rapid, positive method of depositing rubber upon a cord, thread or fabric by immersing same in latex.

Latex used in the practice of the invention may be compounded in any desired manner and contain any suitable gelling and vulcanizing ingredients.

When a greater vacuum is required in order to give complete impregnation, the steam used for saturation purposes may be superheated at atmospheric pressure, whereby its volume is materially increased, which sets up a greater vacuum when the steam is condensed and which also increases the rate of heat transfer between the steam impregnated article and the latex or other material to be drawn into the steam impregnated article to replace the steam condensed therein. When a viscous substance is to be used in saturating a porous material, such as wood, such substance may be heated to reduce its viscosity to expedite drawing same into the porous material. This heating action is particularly adapted to be used when superheated steam or the like is used to impregnate the porous material initially.

While several embodiments of the invention have been completely illustrated and described herein, it will be appreciated that the scope of the invention includes modifications thereof such as come under the appended claim.

What is claimed is:

That method of forming rubber articles from an aqueous rubber dispersion, said method comprising the steps of impregnating with steam a porous mold having an impervious skin over its outer surface and which is adapted to receive latex therein, associating the impregnated mold with a rubber dispersion, condensing the steam in the pores of the mold to form a vacuum therein, and drawing water from the dispersion into the pores of the mold to deposit rubber onto the mold, whereby substantially the entire shrinkage vacuum produced acts upon the inner surface of the mold.

MITCHELL CARTER.

---

CERTIFICATE OF CORRECTION.

Patent No. 2,367,819.　　　　　　　　　　　　　　　January 23, 1945.

MITCHELL CARTER.

It is hereby certified that error appears in the printed specification of the above numbered patent requiring correction as follows: Page 2, second column, line 14, strike out the word and comma "oil,"; and that the said Letters Patent should be read with this correction therein that the same may conform to the record of the case in the Patent Office.

Signed and sealed this 15th day of May, A. D. 1945.

Leslie Frazer (Seal)　　　　　　　　　　　　　　　Acting Commissioner of Patents.